(12) United States Patent
Kari et al.

(10) Patent No.: US 6,480,485 B1
(45) Date of Patent: Nov. 12, 2002

(54) PACKET RADIO NETWORK WITH CHARGING INFORMATION COLLECTED BY NODES AND FORWARDED TO BILLING CENTER

(75) Inventors: Hannu Kari, Veikkola (FI); Jari Hämäläinen, Kangasala (FI)

(73) Assignee: Nokia Telecommunications Oy, Espoo (FI)

(*) Notice: Subject to any disclaimer, the term of this patent is extended or adjusted under 35 U.S.C. 154(b) by 0 days.

(21) Appl. No.: 09/101,569
(22) PCT Filed: Jan. 14, 1997
(86) PCT No.: PCT/FI97/00019
  § 371 (c)(1),
  (2), (4) Date: Oct. 14, 1998
(87) PCT Pub. No.: WO97/26739
  PCT Pub. Date: Jul. 24, 1997

(30) Foreign Application Priority Data

Jan. 15, 1996 (FI) .................................................. 960185

(51) Int. Cl.⁷ .......................... H04J 3/24; H04L 12/28; H04M 15/00; H04M 11/00; H04Q 7/20
(52) U.S. Cl. ................. 370/352; 370/349; 370/397; 379/114; 379/121; 455/407; 455/445
(58) Field of Search ............................ 370/352, 349, 370/397, 546, 389, 384; 379/114, 115, 116, 126, 229, 130; 455/445, 405, 406, 407, 408

(56) References Cited

U.S. PATENT DOCUMENTS

| | | | |
|---|---|---|---|
| 4,640,986 A | | 2/1987 | Yotsutani et al. |
| 5,103,475 A | | 4/1992 | Shuen |
| 5,168,498 A | * | 12/1992 | Adams et al. .............. 370/349 |
| 5,732,127 A | * | 3/1998 | Hayes ........................ 379/115 |
| 5,828,737 A | * | 10/1998 | Sawyer ...................... 379/114 |
| 5,873,030 A | * | 2/1999 | Mechling et al. .......... 455/408 |
| 5,875,238 A | * | 2/1999 | Glitho et al. .............. 375/116 |
| 6,044,259 A | * | 3/2000 | Hentila et al. ............. 455/406 |
| 6,115,600 A | * | 9/2000 | Tuohino et al. ............ 455/405 |
| 6,195,543 B1 | * | 2/2001 | Granberg .................... 455/407 |

FOREIGN PATENT DOCUMENTS

| | | |
|---|---|---|
| DE | 44 19 651 | 12/1995 |
| WO | WO 95/22230 | 8/1995 |

OTHER PUBLICATIONS

1992, Mouly, et al., *The GSM System for Mobile Communications*.

* cited by examiner

*Primary Examiner*—Wellington Chin
*Assistant Examiner*—M. Phan
(74) *Attorney, Agent, or Firm*—Altera Law Group, LLC

(57) ABSTRACT

In a digital mobile communication system, a packet radio system has been implemented by employing the radio interface of the mobile communication network. The packet radio system comprises packet radio support nodes (SGSN) connected to the mobile communication network, as well as gateway support nodes for providing an inter-connection to an external packet data network (15). The support nodes (SGSN, GGSN) are connected to an intra-operator packet switched backbone network (13). The serving support nodes and the gateway support nodes collect charging information on usage of the radio interface and the data network (15), respectively. The system is further provided with a billing gateway support node (BGGSN) connected to the internal backbone network (BGGSN) to receive user-specific charging information collected by the other support nodes, and to forward the charging information to a charging system.

13 Claims, 1 Drawing Sheet

PACKET RADIO NETWORK WITH CHARGING INFORMATION COLLECTED BY NODES AND FORWARDED TO BILLING CENTER

FIELD OF THE INVENTION

The present invention relates to packet radio networks and particularly to carrying out charging in packet radio networks.

BACKGROUND OF THE INVENTION

Mobile communication systems have been developed in order to make people free to move away from fixed telephone terminals without, however, making them more difficult to reach. With an increasing usage of data transfer services in offices, various kinds of data services have been introduced to the mobile communication systems as well. Portable computers enable efficient data processing wherever the user may be. Mobile communication networks, in turn, provide users with an efficient access network for mobile data transfer, the access network providing access to actual data networks. For this purpose, various new forms of data service are being planned in present and future mobile communication networks. Mobile data transfer is particularly well supported by digital mobile communication systems, such as the Pan-European mobile communication system, GSM (Global System for Mobile Communication).

A new service in the GSM system is provided by GPRS (General Packet Radio Service), which is one of the topics for GSM stage 2+ standardization work being done in ETSI (European Telecommunication Standard Institute). The GPRS operational environment is constituted by one or more subnetwork service areas which are inter-connected by a GPRS Backbone Network. The subnetwork comprises a group of packet data service nodes SN, herein referred to as serving GPRS support nodes SGSN, each of which is connected to the GSM mobile communication network so that it is able to provide mobile data terminal equipments with a packet data service via a multitude of base stations i.e. cells. The mobile communication network in between offers a packet switched data transfer between the support node and the mobile data terminal equipments. The different subnetworks, in turn, are connected to an external data network, e.g. to a packet switched public data network PSPDN, via specific gateway GPRS support nodes, GGSN. Thus, the GPRS service provides packet data transfer between mobile data terminal equipments and external data networks with the GSM network serving as an access network. One of the features of the GPRS service network is that it operates almost independently of the GSM network with the "conventional" GSM network services.

One of the problems is how to carry out charging in the GPRS network. User-related data transmission statistics, used for charging the user, are normally gathered at the serving GPRS support nodes SGSN and at the gateway GPRS support nodes GGSN. The SGSN collects information about the radio interface usage and the GGSN collects information about the data network usage. The number of SGSNs and GGSNs in an MSC service area can be quite high, tens or even hundreds of nodes. However, no suggestions exist as to how to carry out charging using such scattered charging information. In the GSM mobile communication network, the billing records (Call Detailed Records) are typically generated at the mobile communication network or in an Intelligent Network IN coupled thereto. However, there are no direct interfaces from the GPRS system to the mobile network or the IN suitable also for the GPRS charging. A further problem is that the billing centers and the interfaces they use have not been standardized even in the mobile communication networks and are consequently different for every operator. This would require implementing different interfaces in different GPRS networks. Similar problems may also occur in other packet radio networks of the GPRS network type.

BRIEF SUMMARY OF THE INVENTION

It is object of the present invention to enable billing in packet radio networks.

A further object of the present invention is a charging information collecting system which is independent of the billing system implementation in a packet radio network.

The invention relates to a packet radio system comprising a digital mobile communication network; packet data terminal equipments; packet radio support nodes connected to the mobile communication network which provides them with a radio interface for packet switched data transmission with the packet data terminal equipments; gateway packet radio support nodes providing an access point to an external packet data network; and an internal packet switched backbone network to which the packet radio support nodes and the gateway packet radio support nodes are connected. The packet radio network according to the invention further comprises a billing gateway support node, which is connected to said internal backbone network to receive user-specific charging information collected by other support nodes and to forward the charging information to the billing system.

The basic idea of the invention is to provide the internal backbone network of the packet radio network with a new support node establishing a gateway from the packet radio network to the actual billing system. This support node is herein referred to as a billing gateway GPRS support node BGGSN. As the BGGSN is connected to the packet switched backbone network within the packet data network, it is possible to exchange information between the BGGSN and any other support node in the packet radio system, even in case the nodes are in packet radio networks controlled by different operators. The transmitting support node only needs to know the address of the receiving support node. Between the support nodes that collect charging information and the BGGSNs, a communication protocol can be determined which is independent of the implementation of the operator's charging system, and the same in all the packet radio networks. In case the support node collecting charging information wishes to transmit charging information of a specific subscriber, it transmits the information to a specific billing gateway GPRS support node which forwards the charging information, either directly or indirectly, to the operator's charging system.

The communication protocol between the billing gateway GPRS support node and the operator's billing system may be operator-specific. The other support nodes in the packet radio network, however, need not know the implementation of this interface as the interface between the support nodes and the billing gateway GPRS support node is standard.

The invention provides a number of advantages. In the packet radio network, only one charging interface is determined. Charging in the packet radio network is standardized, but it is not restricted to one embodiment or charging system communication protocol. The operator only needs one interface for the charging system, and not e.g. a dedicated interface in every support node. The operator may send charging information directly to another operator, from one billing gateway GPRS support node to another.

BRIEF DESCRIPTION OF THE DRAWINGS

In the following, the invention will be described by means of its preferred embodiments, with reference to the attached drawing in which the GPRS system according to the invention is shown.

The present invention is applicable to different types of packet radio systems in which support nodes are connected by a common backbone network. The invention is particularly well applicable to implementing a General Packet Radio Service (=GPRS) in the Pan-European digital mobile communication system GSM (Global System For Mobile Communication) or similar mobile communication systems, such as the DCS1800 and the PCS (Personal Communication System). Below, the preferred embodiments of the invention will be described by means of a GPRS packet radio network, which is a combination of the GPRS service and the GSM system, without, however, restricting the invention to such a specific packet radio system.

Figure 1:
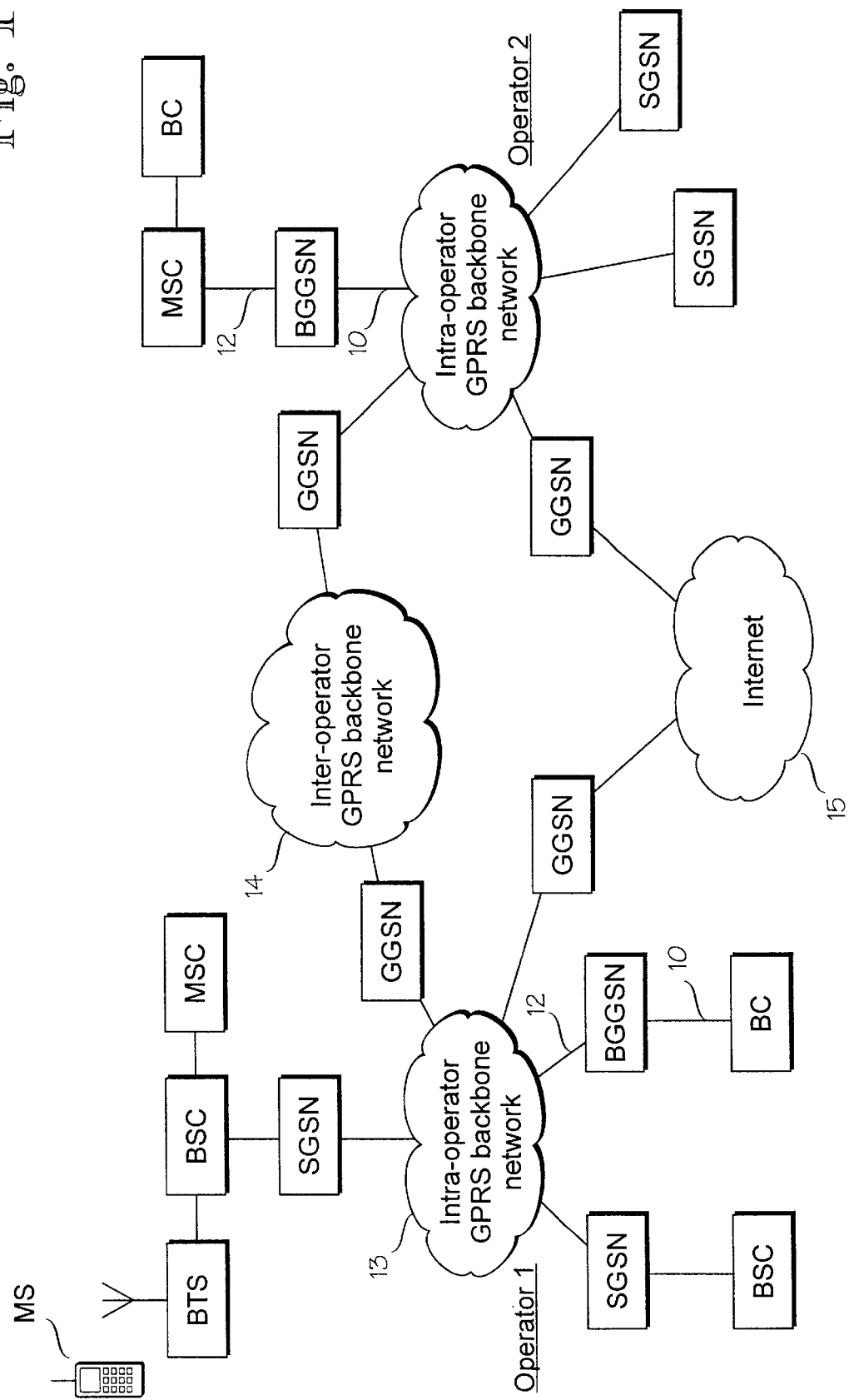

The figure illustrates a GPRS packet radio network implemented in the GSM system.

The basic structure of the GSM network consists of two parts: a base station system BSS and a network subsystem NSS. The BSS and mobile stations MS communicate through radio connections. Within the BSS each cell is served by a base station BTS. A number of base stations is connected to a base station controller BSC whose function is to control radio frequencies and channels used by the BTS. The BSCs are connected to a mobile services switching center MSC. For a more detailed description of the GSM system, reference is made to the ETSI/GSM recommendations and "The GSM System for Mobile Communications", M. Mouly and M. Pautet, Palaiseau, France, 1992, ISBN:2-9507190-07-7.

In the figure, the GPRS system connected to the GSM system comprises two GPRS operators; operator 1 and operator 2, both having two serving GPRS support nodes (SGSN) and a gateway GPRS support node (GGSN). The different support nodes SGSN and GGSN are interconnected by an Intra-Operator Backbone Network. It should be understood that the GPRS network may have any number of support and gateway nodes.

In a cellular packet radio network, each support node SGSN controls a packet data service within the area of one or more cells. For this purpose, each support node SGSN is connected to a specific local part of the GSM mobile communication system. This connection is typically to the mobile services switching center, but in some cases it might prove advantageous to make the connection directly to the base station system BSS, in other words, to the BSC or one of the base stations BTS. A mobile station MS in a cell communicates over the radio interface with the base station BTS and further, via the mobile communication network, with the support node SGSN in whose service area the cell is located. In principle, the mobile communication network between the support node SGSN and the mobile station MS may forward packets between these two. For this purpose, the mobile communication network may offer either a circuit switched connection or a packet switched data packet transfer scheme between the mobile station MS and the serving support node SGSN. An example of a circuit switched connection between a mobile station MS and a support node (Agent) is disclosed in the Finnish patent application 934115. An example of a packet switched data transfer between a mobile station MS and a support node (Agent) is disclosed in the Finnish patent application 940314. However, it should be noted that the mobile communication network only provides a physical connection (access network) between the MS and the SGSN, and its exact operation or structure have no relevance to the present invention.

The intra-operator backbone network 13, which interconnects the apparatuses SGSN and GGSN of the operator, may be implemented e.g. by a local area network, such as an IP network, a CLNP network or an X.25 network. It should be noted that an operator's GPRS network may also be implemented without an intra-operator backbone network, for example by implementing all the features in one and the same computer; such an alteration does not change the charging principles of the invention.

The gateway GPRS support node GGSN connects the operator's GPRS network to the GPRS systems of other operators and to data networks 15, such as an Inter-Operator Backbone Network, an IP network (Internet) or an X.25 network.

The inter-operator backbone network is a network through which the GGSNs of different operators may communicate with one another. This communication is required to support GPRS roaming between different GPRS networks. The inter-operator backbone network may be implemented by using e.g an X.25, IP, CLNP or other networks as long as the GGSN of both sides employ the same protocols toward the backbone network between the operators. To take an example, if the intra-operator network is an IP network, an operator 1 may have an internal X.25 network (in the intra-backbone network of operator 1), and an operator 2 may have an internal CLNP network (in the intra-backbone network of operator 2). In such a case, the GPRS GSN of the operator 1 should use X.25 protocol locally and the IP protocol toward the inter-operator backbone network. Similarly, the GPRS GSN of the operator 2 should use the CLNP protocol locally and the IP protocol toward the inter-operator backbone network. It should be noted that if the networks of both the operators and the network in between all use the same protocol, the GGSNs between them is not necessarily required but they may be replaced by e.g. data network bridges or routers.

The gateway GPRS support node GGSN is also used for storing location information of GPRS mobile stations. The GGSN also routes mobile-terminating (MT) data packets. The GGSN also comprises a database which maps together the network address of the mobile station, e.g. in the IP, X.25, or CLNP network, or simultaneously in a plurality of them, and the GPRS roaming identity of the mobile station in the GPRS network.

User-related data transfer statistics, used for charging the user, are also collected mainly at the serving GPRS support nodes SGSN, and in the gateway GPRS support nodes GGSN. The SGSN collects information about the radio interface usage and the GGSN collects information about the data network usage. Typically, charging in the packet radio system consists of subscriber fees and traffic fees. The subscriber fee is a regular payment paid by the subscribers to cover a specific period of time. The traffic fees are typically determined in a packet radio network as a function of data amount and service type, possibly service quality as well. The data amount measuring techniques may include simply counting the bytes or an advanced statistical sampling of the data traffic. In principle, charging for usage of a packet radio network should be possible the same way as in general packet switched data networks. The exact charging basis may be operator-specific. The charging principles are not significant as far as the present invention is concerned, because it is generally applicable to different charging methods.

The operator's billing system, which carries out the final subscriber billing on the basis of the charging information collected, may be located freely as it is not a part of the actual packet radio network. In the example of the figure, the charging system is placed apart from the actual packet radio network in a specific charging center BC. Alternatively, it may be situated e.g. at the MSC. The exact implementation of the charging center BC may vary operator-specifically. The exact implementation of the BC is not essential to the present invention, because it is generally applicable to different charging centers.

The internal backbone network of the packet radio network according to the invention is provided with a new support node, which provides a gateway from the packet radio network to the actual charging system, such as the charging center BC. This support node is herein referred to as a billing gateway GPRS support node BGGSN. As the BGGSN is connected to the intra-operator packet switched backbone network, it is possible to exchange information between the BGGSN and any other support node SGSN or GGSN in the packet radio network, even if the nodes are in packet radio networks of different operators. The transmitting support node only need to know the address of the receiving support node. Between the support nodes SGSN or GGSN that collect charging information and the BGGSNs there exists a communication protocol which is independent of the implementation of the operator's charging system, and the same in all the packet radio networks. In case the SGSN or GGSN collecting charging information wishes to transmit charging information of a specific subscriber (identified with e.g. an international mobile subscriber identity IMSI in the GPRS system) to the charging center BC, it transmits the information in data packets corresponding to the protocol (e.g. IP) of the backbone network, the data packets containing the network address (e.g. IP address) of a specific BGGSN. The data field of the data packet may contain the charging information in a suitable format. The data field may contain subfields which contain the IMSI, data amount and the service type. The BGGSN receiving the data packet forwards the charging information to the operator's charging center BC. The exact implementation of the protocol used in the charging information transfer is not essential to the invention, but the invention is generally applicable to all the protocols. The BGGSN may also buffer, combine or pre-process the charging information in some other way before sending it to the EC.

The BGGSN address to which other support nodes send charging information may be either fixed or dynamic. In the former case, the support node SGSN or GGSN always sends the charging information to the same BGGSN whose address is permanently stored in the support node. In the latter case, the BGGSN to which the charging information is sent varies e.g. according to the service type or subscriber. In case the address varies according to subscribers, the address of the correct BGGSN is given to the support node when the subscriber begins to use a GPRS service. The BGGSN to which the support node sends the charging information may be within the network of the same or a different operator. For example, the SGSN in the network controlled by the operator 1 may send charging information to the BGGSN of the same network, when the subscriber's home network is the network of the operator 1. However, the same SGSN may also send charging information to the BGGSN of the operator 2, when the home network of the subscriber 2 is the network controlled by the operator 2 and the subscriber is roaming in the network of the operator 1. In such a case, a data packet containing the charging information is routed from one network to another the same way as other data packets. In a similar manner, the BGGSNs (and consequently BCs) of different operators may also exchange information by sending data packets from one network to another via the inter-operator backbone network or data network. It is also possible that the SGSN sends the charging information to the BGGSN of the operator 1, even if the home network of the subscriber 2 is the network controlled by the operator 2 and the subscriber is roaming in the network of the operator 1 (the visitor network).

The BGGSN may be connected to the BC either directly (as the operator 1 BGGSN connection 12 in the figure), or indirectly via an intermediate network (such as an intelligent network IN) or a network element (as the operator 2 BGGSN connection 12 in the figure). The connection and communication protocol between the BGGSN and the operator's charging center BC may be operator-specific. It may be based e.g. on SS7 (Signalling System 7) employed by e.g. the GSM system. The connection and the communication protocol are not significant as far as the invention is concerned, as the invention is meant to be generally applicable to all the solutions.

The description is only intended to illustrate the preferred embodiments of the present invention. The invention is not to be restricted to these examples, but it may be modified within the scope of the attached claims.

What is claimed is:

1. A packet radio system comprising:
    a digital mobile communication network;
    packet data terminal equipments;
    packet radio support nodes connected to the mobile communication network which provides them with a radio interface for packet switched data transmission with the packet data terminal equipments;
    gateway packet radio support nodes providing an access point to an external packet data network;
    an internal packet switched backbone network to which the packet radio support nodes and the gateway packet radio support nodes are connected; and
    a billing gateway support node, connected to said internal backbone network to receive user-specific charging information collected by the other support nodes and to forward the charging information to the charging system.

2. The packet radio system as claimed in claim 1, wherein the communication protocol between the billing gateway support node, the packet radio support nodes and the gateway packet radio support nodes is a packet switched communication protocol of said internal backbone network.

3. The packet radio system as claimed in claim 1, wherein the communication protocol between the billing gateway support node, the packet radio support nodes and the gateway packet radio support nodes is independent of a communication protocol between the gateway support node and the charging system.

4. The packet radio system as claimed in claim 1, wherein the communication protocol between the billing gateway support node and the charging system is different from a packet switched communication protocol of said internal backbone network.

5. The packet radio system as claimed in claim 1, wherein the billing gateway support node is provided with a direct connection to the billing system.

6. The packet radio system as claimed in claim 1, wherein the billing gateway support node is connected to the billing system via an intermediate network, such as an intelligent network, or via an intermediate network element, such as a mobile services switching center.

7. The packet radio system as claimed in claim 1, wherein the address of the billing gateway support node to which the other support nodes send charging information is fixed.

8. The packet radio system as claimed in claim 1, wherein the address of the billing gateway support node to which the other support nodes send charging information is dynamic.

9. The packet radio system as claimed in claim 8, wherein the address of the billing gateway support node to which the other support nodes send charging information is subscriber-specific and is given to the respective other support node when the subscriber begins using a service.

10. The packet radio system as claimed in claim 8, wherein the support nodes are arranged to send the charging information to the billing gateway support node of the subscriber's home network or the visited network.

11. The packet radio system as claimed in claim 2, wherein the communication protocol between the billing gateway support node, the packet radio support nodes and the gateway packet radio support nodes is independent of a communication protocol between the gateway support node and the charging system.

12. The packet radio system as claimed in claim 2, wherein the communication protocol between the billing gateway support node and the charging system is different from a packet switched communication protocol of said internal backbone network.

13. The packet radio system as claimed in claim 3, wherein the communication protocol between the billing gateway support node and the charging system is different from a packet switched communication protocol of said internal backbone network.

* * * * *